Jan. 16, 1923.

C. S. RICKER.
MOUNTING FOR AUTOMOTIVE ENGINES AND TRANSMISSION.
FILED JULY 2, 1920.

1,442,235.

Inventor
Chester S. Ricker,
By
Hood&Ashby,
Attorneys

Patented Jan. 16, 1923.

1,442,235

UNITED STATES PATENT OFFICE.

CHESTER S. RICKER, OF INDIANAPOLIS, INDIANA.

MOUNTING FOR AUTOMOTIVE ENGINES AND TRANSMISSION.

Application filed July 2, 1920. Serial No. 393,537.

*To all whom it may concern:*

Be it known that I, CHESTER S. RICKER, a citizen of the United States, residing at Indianapolis, in the county of Marion and State of Indiana, have invented a new and useful Mounting for Automotive Engines and Transmission, of which the following is a specification.

It is the object of my invention to provide a simple mounting for an automotive engine and transmission, whereby the two when assembled are in proper alinement and have a common intermediate support which permits either the engine or the transmission to be removed without disturbing the other, and which permits the engine to be swung around its axis to bring any part uppermost to facilitate repair and, especially in the case of radial type engines, to equalize wear.

Figure 1:
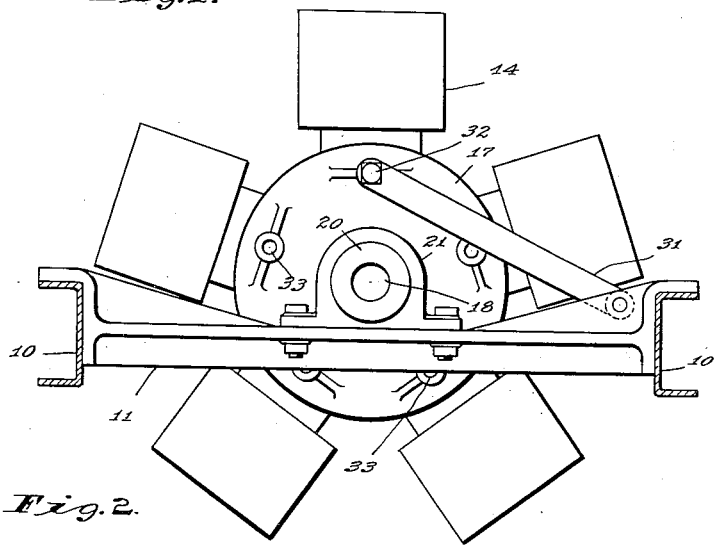
Figure 2:
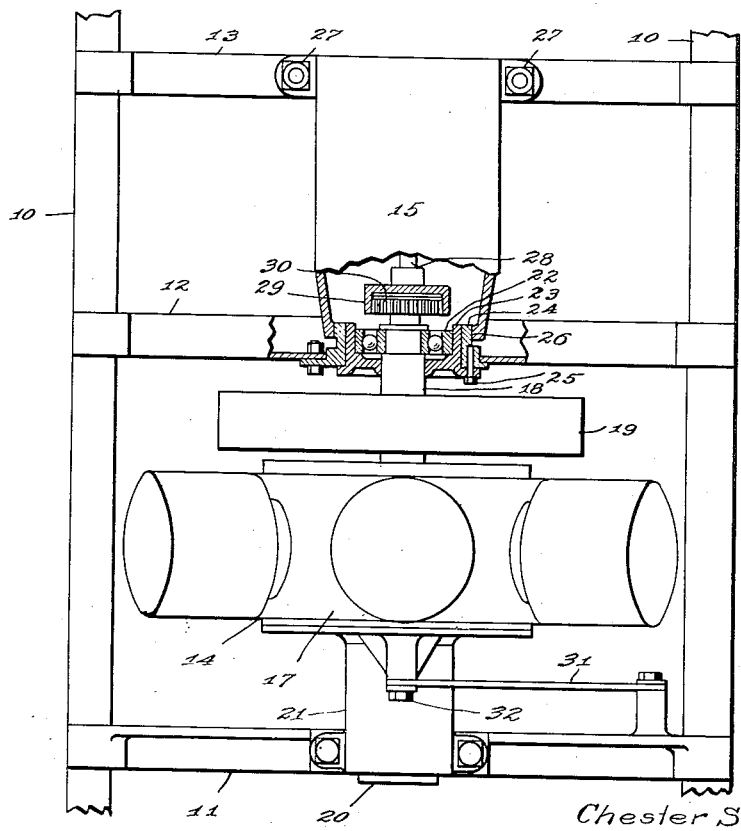

The accompanying drawing illustrates my invention in a very diagrammatic manner. Fig. 1 is a front elevation of part of an automobile frame with an engine mounted therein in accordance with my invention; and Fig. 2 is a plan, with some parts in section, of the same mechanism, showing the cross members of the automobile frame and the engine and transmission in place.

The automobile frame ordinarily has side bars 10, connected by cross-bars, of which I use three cross-bars 11, 12, and 13 for supporting the engine and transmission. The engine 14 is mounted between the cross-bars 11 and 12, and the transmission 15 between the cross-bars 12 and 13. As shown, the engine 14 is of the radial type, which is the type I prefer and for which type my mounting is especially advantageous, and which has its radial cylinders around a central crank-case 17 in which is mounted on suitable bearings (not shown) the usual crank-shaft 18 carrying the usual flywheel 19.

The crank-case 17 has a forwardly projecting trunnion 20 mounted in a suitable supporting bearing 21 carried by the cross-bar 11 of the frame. This furnishes one point of support for the engine. The trunnion 20 may be hollow, as shown in Fig. 1, so that it also serves as a bearing for the crank-shaft 18.

The rearwardly projecting end of the crank-shaft 18 is mounted, preferably in anti-friction bearings 22, in a supporting sleeve 23, which fits in and is carried by a supporting ring 24 mounted in a cross-bar 12 of the frame. This furnishes a second point of support for the engine; and but two supporting points are used. The supporting sleeve 23 is forwardly removable from the supporting ring 24, with the engine and its crank-shaft 18 and the bearings 22, and when in place is preferably held from turning in any suitable way, as by screws 25. The sleeve 23 may be made to fit within the ring 24 with great accuracy.

The transmission mechanism 15 has at its forward end a sliding fit 26 on the supporting ring 24, which fit is co-axial with the mounting of the crank-shaft on such ring and may also be a very accurate one; and at its rearward end is bolted by bolts 27 to the cross-bar 13 of the frame. As shown, the fit 26 is on the outside of the ring, but that is not essential. By removing the bolts 27, the entire transmission mechanism may be removed by withdrawing it rearwardly to disengage the transmission mechanism from the supporting ring 24.

Within the forward end of the transmission mechanism 15 the crank-shaft 18 is connected to the power-receiving shaft 28 of the transmission mechanism by an axially separable clutch joint which permits either the engine or the transmission mechanism to be axially removed without disturbing the other. As shown this axially separable joint comprises an internal gear member 29 fixed on the power-receiving shaft 28, and an external gear member 30 fixed on the rear end of the crank-shaft 18, the two gears being co-axial and of the same diameter and serving as a jaw-clutch when interengaged.

In order to prevent the entire engine 14 from turning about its two points of support on the trunnion 20 and the bearing 22, I connect the crank-case to the cross-bar 11 by a rod 31, which is fastened to both associated members at points removed from the axis of the engine. The rod 31 is preferably a tension member, as illustrated for right-hand rotation of the crank-shaft 18, though this is not essential. The rod 31 is fastened to the crank-case 17 by a removable screw 32, which is received in a suitable hole in the crank-case, so that upon the removal of such screw 32 the engine frame may be turned to bring any cylinder uppermost, or any part uppermost if the engine is other than the radial type. This facilitates repair. If desired, especially in the radial type engine, the crank-case 17 may be provided with any number of holes 33 for receiving the screw 32, to fasten the engine frame in any of a number of positions, thus permitting the position of the engine frame to be varied from time to time to equalize wear.

In operation, the rod 31 holds the engine frame from turning, and the crank-shaft 13 drives the power-receiving shaft 28 of the transmission mechanism through the clutch 29—30. The power from the shaft 28 is transmitted to the driving wheels in any usual and convenient manner. If it is desired to repair the engine, the part which is to be repaired may be brought to convenient position by first removing the screw 32. If it is desired to remove the engine bodily, the bearing 21 is removed, the screws 25 are removed, and then the whole engine with the bearing 22 and sleeve 23 is drawn forward to separate the gear members 29 and 30, whereupon the engine can be lifted out. The engine can be returned to position by reversing the foregoing operation. This removal and return of the engine does not disturb the transmission mechanism. Similarly, if it is desired to remove the transmission mechanism, the bolts 27 are removed and the transmission mechanism drawn bodily rearward. This also separates the gear members 29 and 30, and separates the forward end of the transmission mechanism from its support on the ring 24, after which separation the transmission mechanism may be lifted out. The transmission mechanism may be returned to position by reversing this operation. This removal and return of the transmission mechanism is made without disturbing the engine and its mounting. When either part is removed or returned, it is always brought to proper co-axial position by the fact that the adjacent ends of the transmission mechanism and the engine have a common support on the supporting member 24.

I claim as my invention:

1. In an automotive device, the combination of an engine, transmission mechanism, the crank-shaft of said engine and the power-receiving shaft of said transmission mechanism having an axially separable driving connection, and supports for said engine and said transmission mechanism, said supports including a common intermediate support on which both said engine and said transmission mechanism are supported and from which either is separable by axial movement while the other remains in place.

2. In an automotive device, the combination of an engine, transmission mechanism, the crank-shaft of the engine and the power-receiving shaft of the transmission mechanism having an axially separable driving connection, and supports for said engine and said transmission mechanism, said supports including a common intermediate support on which adjacent ends of the engine and transmission mechanism are mounted, said engine being supported by its crank-shaft on said common support, and said engine and said transmission mechanism each being separately axially separable from said common support so that by axial movement either such engine or such crank-shaft may be both disconnected from the other and separated from its support.

3. In an automotive device, the combination of an engine, transmission mechanism, the crank-shaft of the engine and the power-receiving shaft of the transmission mechanism having an axially separable driving connection, supports for said engine and said transmission mechanism, said supports including a common intermediate support on which adjacent ends of the engine and the transmission mechanism are mounted, said engine being supported by its crank-shaft on said common support, and said engine and said transmission mechanism each being separately axially separable from said common support so that by axial movement either such engine or such crank-shaft may be both disconnected from the other and separated from its support, and an anti-friction bearing between said crank-shaft and said common support and by which said crank-shaft is supported from said support, said anti-friction bearing being separable from said common support with said engine when the latter is removed.

4. In an automotive device, the combination of an engine, transmission mechanism, the crank-shaft of the engine and the power-receiving shaft of the transmission mechanism having an axially separable driving connection, supports for said engine and said transmission mechanism, said supports including a common intermediate support on which adjacent ends of the engine and the transmission mechanism are mounted, said engine being supported by its crank-shaft on said common support, and said engine and said transmission mechanism each being separately axially separable from said common support so that by axial movement either such engine or such crank-shaft may be both disconnected from the other and separated from its support, and an anti-friction bearing between said crank-shaft and said common support and by which said crank-shaft is supported from said support.

5. In an automotive device, the combination of an engine, a support for said engine on which support the engine is rotatably mounted on the axis of its crank-shaft, and a longitudinally stressed rod interconnecting a point on the engine removed from said crank-shaft axis to a point on said support likewise removed from said crank-shaft axis to prevent the engine from turning as a whole on its support when in operation.

6. In an automotive device, the combination of an engine, a support for said engine on which support the engine is rotatably mounted on the axis of its crank-shaft, and a rod interconnecting a point on the engine removed from said crank-shaft axis to a point on said support likewise removed from said crank-shaft axis to prevent the engine from turning as a whole on its support when in operation, the engine being provided with a plurality of connection points for said rod at different angular locations so that the engine may be operated in different positions with relation to said support.

7. In an automotive device, the combination of a radial-type engine, a support for said engine on which support the engine is rotatably mounted on the axis of its crank-shaft, and a rod interconnecting a point on the engine removed from said crank-shaft axis to a point on said support likewise removed from said crank-shaft axis to prevent the engine from turning as a whole on its support when in operation, the engine being provided with a plurality of connection points for said rod at different angular locations so that the engine may be operated in different positions with relation to said support.

8. In an automotive device, the combination of an engine, a support for said engine on which support the engine is rotatably mounted on the axis of its crank-shaft, and a rod interconnecting a point on the engine removed from said crank-shaft axis to a point on said support likewise removed from said crank-shaft axis to prevent the engine from turning as a whole on its support when in operation, the connection from said engine to said support by said rod being separable to permit the engine to be turned relatively to the support when desired.

9. In an automotive device, the combination of an engine having a crank-shaft, and a support for said engine, said support including a bearing for said crank-shaft by which bearing and crank-shaft one end of the engine is carried.

10. In an automotive device, the combination of an engine having a crank-shaft, said engine having a trunnion projecting at one end in which trunnion the crank-shaft has a bearing co-axial with said trunnion, and said crank-shaft projecting at the other end, and supports in which said trunnion and said projecting crank-shaft are respectively carried to support the engine thereby.

11. In an automotive device, the combination of an engine having a frame and a crank-shaft, means for supporting the engine at one end by said frame, and means for supporting the engine at the other end by the crank-shaft.

12. In an automotive device, the combination of an engine, transmission mechanism, the crank shaft of said engine and the power-receiving shaft of said transmission mechanism having an axially separable driving connection, and supports for said engine and transmission mechanism arranged so that either the engine or transmission mechanism may be removed by axial withdrawal and by such axial withdrawal separate it from the other at such separable driving connection.

13. In an automotive device, the combination of an engine, a support for said engine on which support the engine is rotatably mounted on the axis of its crank-shaft, and releasable means for rigidly holding the engine from rotating on its axis.

In witness whereof, I have hereunto set my hand at Indianapolis, Indiana, this twenty-second day of June, A. D. one thousand nine hundred and twenty.

CHESTER S. RICKER.